(12) United States Patent
Kim et al.

(10) Patent No.: US 11,482,747 B2
(45) Date of Patent: Oct. 25, 2022

(54) POUCH-TYPE SECONDARY BATTERY

(71) Applicant: SK INNOVATION CO., LTD., Seoul (KR)

(72) Inventors: Tae Il Kim, Daejeon (KR); Jin Go Kim, Daejeon (KR); Seung Noh Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 16 days.

(21) Appl. No.: 16/469,404

(22) PCT Filed: Dec. 20, 2017

(86) PCT No.: PCT/KR2017/015159
§ 371 (c)(1),
(2) Date: Jun. 13, 2019

(87) PCT Pub. No.: WO2018/117657
PCT Pub. Date: Jun. 28, 2018

(65) Prior Publication Data
US 2020/0111999 A1    Apr. 9, 2020

(30) Foreign Application Priority Data

Dec. 20, 2016  (KR) .................. 10-2016-0174845
Dec. 20, 2017  (KR) .................. 10-2017-0175972

(51) Int. Cl.
*H01M 50/10*   (2021.01)
*H01M 50/183*  (2021.01)

(52) U.S. Cl.
CPC ......... *H01M 50/10* (2021.01); *H01M 50/183* (2021.01)

(58) Field of Classification Search
CPC ...... H01M 2/02; H01M 2/021; H01M 2/0207; H01M 2/08; H01M 50/183; H01M 50/10; H01M 50/105
See application file for complete search history.

(56) References Cited

U.S. PATENT DOCUMENTS

| 5,527,616 A  * | 6/1996 | Hatano ..................... B32B 7/12 |
| | | 428/423.1 |
| 2010/0003594 A1* | 1/2010 | Hong .................. H01M 50/172 |
| | | 429/163 |

(Continued)

FOREIGN PATENT DOCUMENTS

| CN | 1574443 A | 2/2005 |
| CN | 102329594 | 1/2012 |

(Continued)

OTHER PUBLICATIONS

Machine Translation, KR-10-20160077871 A (Year: 2016).*

(Continued)

*Primary Examiner* — Maria Laios
*Assistant Examiner* — Adam J Francis
(74) *Attorney, Agent, or Firm* — IP &T Group LLP

(57) ABSTRACT

An embodiment of the present invention relates to a pouch-type secondary battery. According to embodiment of the present invention, the pouch-type secondary battery includes: an case configured to house an electrode assembly from which electrode tab are drawn out; sealing parts formed by adhering the case along outer peripheries of the electrode assembly; and folding parts formed by folding the sealing parts of surfaces on which the electrode tab drawn to an outside of the case is not formed, wherein a length of the folding part has a relationship with a thickness of the electrode assembly as the following equation: $H \leq T/2$ (wherein, H is the height of the folded folding part, T is the thickness of the electrode assembly, based on a cross-section (Continued)

perpendicular to a direction in which the electrode tabs of the electrode assembly are drawn out).

10 Claims, 7 Drawing Sheets

(56) References Cited

U.S. PATENT DOCUMENTS

| | | | | |
|---|---|---|---|---|
| 2011/0244315 | A1* | 10/2011 | Yoon | H01M 50/636 429/176 |
| 2014/0017556 | A1 | 1/2014 | Liu et al. | |
| 2014/0147730 | A1* | 5/2014 | Werner | H01M 50/103 429/163 |
| 2015/0104698 | A1* | 4/2015 | Fung | H01M 50/124 429/175 |
| 2015/0303413 | A1* | 10/2015 | Yun | H01M 50/121 429/185 |
| 2015/0364729 | A1 | 12/2015 | Jang | |

FOREIGN PATENT DOCUMENTS

| | | | |
|---|---|---|---|
| CN | 102969533 A | 3/2013 | |
| CN | 105280955 A | 1/2016 | |
| JP | 3527858 | 5/2004 | |
| KR | 10-0319108 | 12/2001 | |
| KR | 10-0870355 | 11/2008 | |
| KR | 10-2010-0090141 | 8/2010 | |
| KR | 10-1175057 | 8/2012 | |
| KR | 10-1472178 | 12/2014 | |
| KR | 10-20160077871 | * 12/2014 | ......... H01M 50/178 |
| KR | 10-1520153 | 5/2015 | |
| KR | 10-2016-0016500 A | 2/2016 | |
| KR | 10-2016-0077871 | 7/2016 | |

OTHER PUBLICATIONS

Translation of KR-10-20160077871; Pouch Type Secondary Battery for improving Energy; LG Chem LTD (Year: 2014).*
First Office Action issued by the CNIPA on Jun. 1, 2021.
Extended European Search Report issued by the European Patent Office dated Jun. 17, 2020.

* cited by examiner

POUCH-TYPE SECONDARY BATTERY

CROSS-REFERENCE TO RELATED APPLICATIONS

This application is a national stage application of PCT/KR2017/015159 filed on Dec. 20, 2017 which claims priority of Korean patent application number 10-2016-0174845 filed on Dec. 20, 2016 and Korean patent application number 10-2017-0175972 filed on Dec. 20, 2017, respectively. The disclosure of each of the foregoing applications is incorporated herein by reference in its entirety.

TECHNICAL FIELD

The Embodiments of the present invention relate to a pouch-type secondary battery.

BACKGROUND ART

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

A pouch-type secondary battery may be formed by surrounding an electrode assembly with a sheath as a case. At this time, sealing parts are formed by sealing the outermost portions of the case in which the electrode assembly is housed. When assembling the secondary battery module with the sealing parts protruding, a total volume of the secondary battery module is increased due to the sealing parts, such that the energy density of the secondary battery module may be lowered. Further, since the sealing parts surround outer peripheries of the electrode assembly, heat dissipation may be inhibited. For example, even if the secondary battery is disposed on a cooling plate for heat dissipation, the heat transfer from the electrode assembly to the cooling plate may not be smoothly performed due to the sealing parts.

PRIOR ART DOCUMENT

[Patent Document 1] Korean Patent Registration Publication No. 10-1520153 (registered May 7, 2015)

DISCLOSURE

Technical Problem

It is an object of embodiments of the present invention to provide a pouch-type secondary battery in which folding parts of the pouch-type secondary battery are folded so as not to protrude from an electrode assembly, thereby improving an energy density of the secondary battery.

In addition, another object of the present invention is to provide a pouch-type secondary battery which may fold sealing parts of the pouch-type secondary battery, thus to improve problems such as an increase in a volume and defective appearance of the secondary battery module due to the sealing parts.

Further, another object of the present invention is to provide a pouch-type secondary battery in which a folding part is brought into close contact with an electrode assembly through an adhesive member, thereby preventing fluttering, bending, and twisting phenomena of the folding part.

Further, another object of the present invention is to provide a pouch-type secondary battery which may prevent an occurrence of detaching phenomenon in the folding part after curing an adhesive member, by limiting a position in which the adhesive member is injected.

Technical Solution

According to an aspect of the present invention, there is provided a pouch-type secondary battery including: an case configured to house an electrode assembly from which electrode tabs are drawn out; sealing parts formed by adhering the case along outer peripheries of the electrode assembly; and folding parts formed by folding the sealing parts of surfaces on which the electrode tab drawn to an outside of the case is not formed, wherein a length of the folding part has a relationship with a thickness of the electrode assembly as the following equation:

$$H \leq T/2$$

(wherein, H is the height of the folded folding part, T is the thickness of the electrode assembly, based on a cross-section perpendicular to a direction in which the electrode tabs of the electrode assembly are drawn out).

The folding part may include: a first folding state in which the folding part is folded 180 degrees by a half (½) or less of an entire length thereof; and a second folding state in which the folding part is folded so as to completely come into contact with the case of the electrode assembly from the first folding state.

The folded folding part may be attached to one surface of the case by an adhesive member, and the adhesive member may be made of a polyurethane adhesive.

An angle between the folded folding part and one surface of the case may be within a range of 5 degrees or more and 25 degrees or less.

A thickness of the adhesive member cured between the folded folding part and the case may be 0.5 mm or more and 2 mm or less.

A position of the adhesive member located at the folding part may have a relationship with a length of the folded folding part located at the folding part as the following equation:

$$½ \leq H \leq W < H$$

(wherein, W is a distance in which the case of the surface on which the electrode tab is not formed and the folding part are adhered to each other by injecting the adhesive member into the folding part).

A position of the adhesive member located at the folding part may have a relationship with a length of the folded folding part located at the folding part as the following equation:

$$⅔H \leq W < H$$

(wherein, W is a distance in which the case of the surface on which the electrode tab is not formed and the folding part are adhered to each other by injecting the adhesive member into the folding part).

The polyurethane adhesive may have a static shear holding time of 250 hours or more at a temperature 85° C. and a humidity of at 85%.

The polyurethane adhesive may have a viscosity of 10000 to 15000 cps at a temperature of 120° C.

The polyurethane adhesive may have a dielectric breakdown voltage of 5 to 20 kV/mm.

The polyurethane adhesive may have a dielectric breakdown voltage of 8 to 15 kV/mm.

The sealing parts may be formed on four (4) sides along the peripheries of the electrode assembly.

The sealing parts may be formed on three (3) sides along the peripheries of the electrode assembly.

A bottom part may be formed on one side in which the sealing part is not formed.

The case may have a forming part formed therein, which includes a space to house the electrode assembly.

The forming part may have a depth in which the electrode assembly may be housed, and the depth of the forming part may be a 3.8 mm or more and 7 mm or less.

The forming part may have an angle inside thereof, and the angle of the forming part may be 96 degrees or more and 114 degrees or less.

A thickness of the adhesive member applied between the folding part and the case may be determined according to the depth of the forming part, and when the depth of the forming part is 3.8 mm or more and 7 mm or less, the coating thickness of the adhesive member may be 0.36 or more and 2.12 mm or less.

Advantageous Effects

According to the embodiments of the present invention, it is possible to provide a pouch-type secondary battery in which the folding parts of the pouch-type secondary battery are folded so as not to protrude from an electrode assembly, thereby improving an energy density of the secondary battery.

In addition, according to the embodiments of the present invention, it is possible to provide a pouch-type secondary battery which may fold the sealing parts of the pouch-type secondary battery, thus to improve problems such as an increase in a volume and defective appearance of the secondary battery module due to the sealing parts.

Further, according to the embodiments of the present invention, it is possible to provide a pouch-type secondary battery in which the folding part is brought into close contact with the electrode assembly through the adhesive member, thereby preventing fluttering, bending, and twisting phenomena of the folding part.

Further, according to the embodiments of the present invention, it is possible to provide a pouch-type secondary battery which may prevent an occurrence of detaching phenomenon in the folding part after the adhesive member is cured, by limiting a position in which the adhesive member is injected.

BEST MODE

Figure 1:
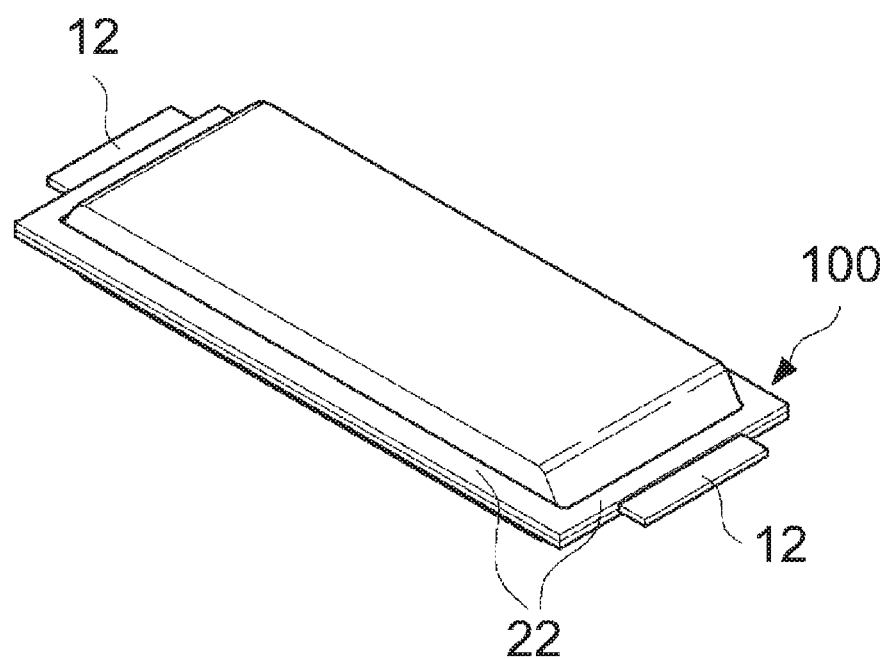
FIG. 1 is a perspective view illustrating a pouch-type secondary battery according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

FIG. 1 is a perspective view illustrating a pouch-type secondary battery according to an embodiment of the present invention.

Referring to FIG. 1, a pouch-type secondary battery 100 according to the embodiment of the present invention includes a case 21 surrounding a secondary battery 10, sealing parts 22 formed by adhering the case 21, and folding parts 23 formed by folding the sealing parts 22.

The secondary battery 10 may include an electrode assembly 11 and cathode and anode electrode tabs 12 drawn out from the electrode assembly 11. The electrode assembly 11 may be a jelly roll wound in an oval shape, or the like in a state in which the cathode electrode tab and the anode electrode tab are alternately overlapped with each other with a separator interposed therebetween. The cathode and anode electrode tabs 12 may be formed at both ends of the electrode assembly 11. The pouch-type secondary battery 100 may be a form in which the secondary battery 10 is housed in the case 21. Specifically, the pouch-type secondary battery 100 may be a form in which the electrode assembly 11 of the secondary battery 10 is housed in the case 21, and the electrode assembly 11 is surrounded by the case 21, then the electrode tabs 12 are drawn to an outside of the case 21.

The case 21 may house the electrode assembly 11 from which the electrode tabs 12 are drawn out. The case 21 may include aluminum. The reason of using the aluminum in the case 21 is to resist severe thermal environments, mechanical impacts, or the like as well as to achieve miniaturization, weight reduction, and slimness. A housing space (not illustrated) having a recessed shape is formed in the case 21, and the electrode assembly 11 may be disposed in the housing space. After disposing the electrode assembly 11, the case 21 may be adhered along the outer peripheries of the electrode assembly 11.

The sealing parts 22 may be formed by adhering the case 21 along the outer peripheries of the electrode assembly 11. The sealing parts 22 are formed by adhering the case 21, and may be formed on four (4) sides along the peripheries of the electrode assembly 11. At this time, the electrode tabs 12 may be drawn to the outside of the sealing part 22 at both ends of the electrode assembly 11. For example, the electrode tabs 12 may be drawn out at both ends in a longitudinal direction of the electrode assembly 11. The sealing parts 22 may be remaining portions of the case 21 after the case 21 is adhered.

A volume of the secondary battery may be increased by a length in which the sealing parts 22 are formed at the outside of the secondary battery. Therefore, in the pouch-type secondary battery 100 according to the embodiment of the present invention, the sealing parts 22 of the remaining portions are folded to form the folding parts 23, such that the volume of the secondary battery may be reduced.

Figure 2A:
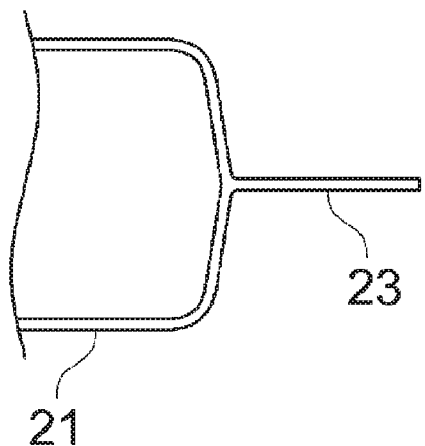
FIGS. 2A, 2B and 2C are cross-sectional views illustrating a process in which a folding part is folded according to the embodiment of the present invention.
Figure 2B:
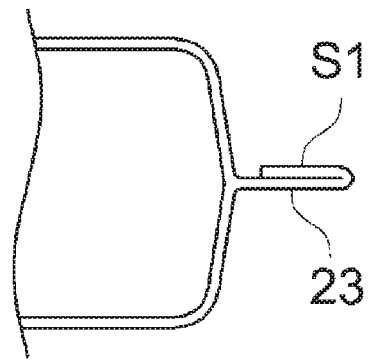
Figure 2C:
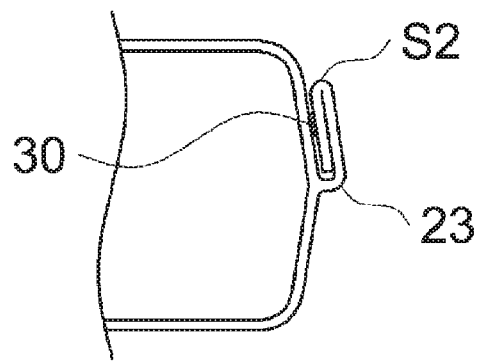

FIGS. 2A, 2B and 2C are cross-sectional views illustrating a process in which the folding part is folded according to the embodiment of the present invention.

FIG. 2A is a cross-sectional view illustrating a state in which a folding part 23 is not folded, briefly, before folding. 2B is a cross-sectional view illustrating a first folding state in which the folding part 23 is folded once, and FIG. 2C is a cross-sectional view illustrating a second folding state in which the folding part 23 is folded twice.

Referring to FIG. 2, the folding part 23 may be formed by folding the sealing part 22 of a surface on which the electrode tab drawn to the outside of the case 21 is not formed.

The folding part 23 may include a first folding state S1 and a second folding state S2 in a form of being folded twice. In the first folding state S1, the folding part 23 may be folded 180 degrees by a half (½) or less of an entire length thereof. In the second folding state S2, the folding part may be folded so as to completely come into contact with the case 21 of the electrode assembly 11 from the first folding state S1. The folding part 23 may be folded at least once, and preferably folded twice or more.

A height of the folding part 23 in a fully folded state including the first folding state S1 and the second folding state S2 may be smaller than a thickness of the electrode assembly 11 (a thickness of the electrode assembly 11 based on a cross-section perpendicular to a direction in which the electrode tabs 12 are drawn out in the electrode assembly 11). Specifically, the height of the folded folding part 23 may have a relationship with the thickness of the electrode assembly 11 as the following equation:

$$H \leq T/2$$

Figure 3A:
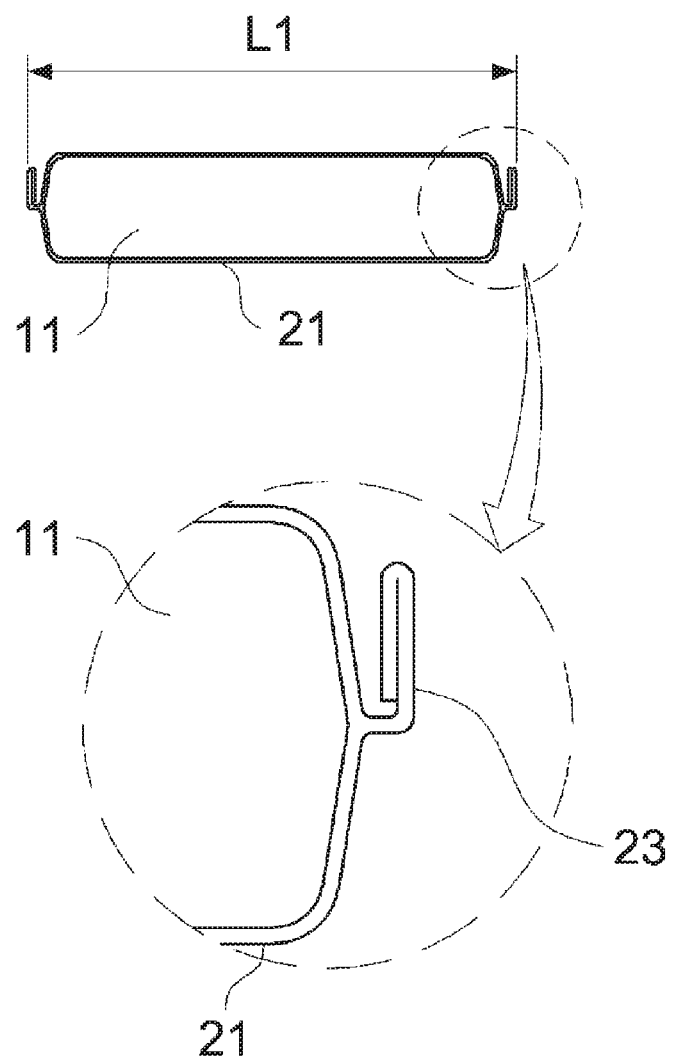
FIGS. 3A and 3B are cross-sectional views illustrating the pouch-type secondary battery and the folding part according to the embodiment of the present invention.
Figure 3B:
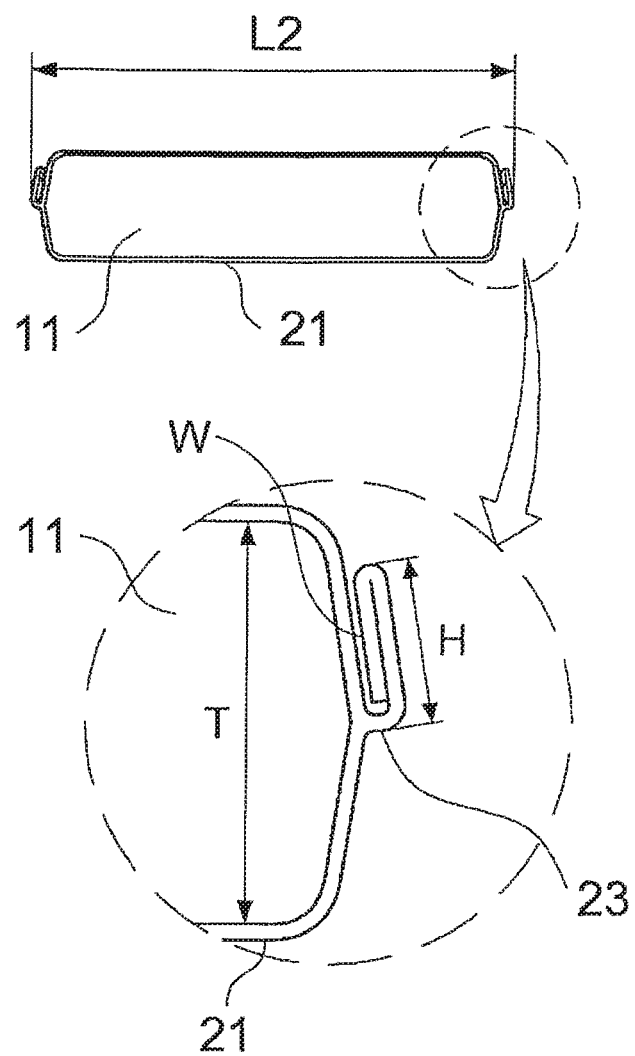

(wherein, H is the height of the folded folding part, T is the thickness of the electrode assembly, based on a cross-section perpendicular to a direction in which the electrode tabs of the electrode assembly are drawn out, see FIGS. 3A and 3B).

By forming the folding part 23 in a range of satisfying the above-described relational equation, it is possible to prevent an unnecessary space from being formed between the adjacent secondary batteries by the folding part 23 when assembling the secondary battery module. That is, since the folding part 23 is formed in a height smaller than the thickness of the electrode assembly 11, the folding part 23 does not protrude from the surface of the case, such that adjacent secondary batteries may be brought into close contact with each other without creating a space therebetween. Therefore, volume efficiency may be increased when assembling the secondary battery module.

Further, the folding part 23 may be attached to one surface of the case 21 by an adhesive member 30.

FIGS. 3A and 3B are cross-sectional views illustrating the pouch-type secondary battery and the folding part according to the embodiment of the present invention.

FIG. 3A is a cross-sectional view illustrating the folding part, and FIG. 3B is a cross-sectional view illustrating when the folding part is brought into close contact with the case.

Referring to FIGS. 3A and 3B, the folding part 23 may be completely adhered to the case 21 surrounding the electrode assembly 11 by the adhesive member 30. When describing by comparing FIGS. 3A and 3B, a length L2 of the pouch-type secondary battery 100 in which the folding parts 23 in the folded state are brought into close contact with and adhered to the case 21 may be smaller than a length L1 of the pouch-type secondary battery 100 including the folding parts 23 in the folded state. The volume of the secondary battery module may be reduced by a difference between the lengths of L1 and L2.

In order to completely adhere the folding parts 23 to the case 21 surrounding the electrode assembly 11, the adhesive member 30 may be used by adhering to the folding parts 23.

Figure 4:
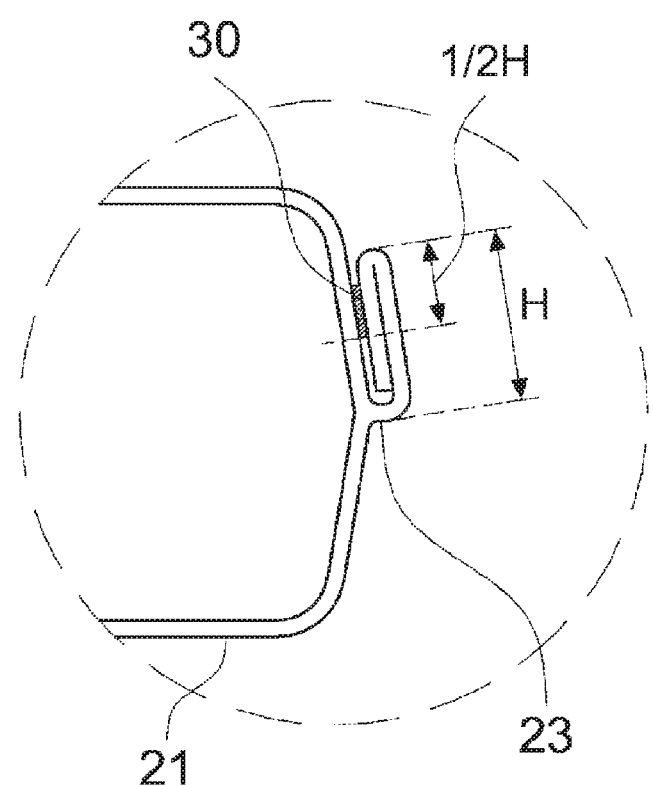
FIG. 4 is a cross-sectional view illustrating a state in which the folding part is adhered by an adhesive member according to the embodiment of the present invention.

FIG. 4 is a cross-sectional view illustrating a state in which the folding part is adhered by the adhesive member according to the embodiment of the present invention.

Referring to FIG. 4, the adhesive member 30 is injected into the folding part 23, such that one surface of the case 21 in which the folding part 23 is formed (that is, one surface of the case 21 to come into contact with the folding part 23) and the folding part 23 come into contact with each other, thus to be fixed to the case 21. A position of the adhesive member 30 located at the folding part 23 may have a relationship with a length of the folded folding part as the following equation:

$$\tfrac{1}{2}H \leq W < H$$

(wherein, W is a distance between a portion in which the case of the surface on which the electrode tab is not formed and the folding part are adhered by injecting the adhesive member into the folding part and a portion in which the folding part and the case are connected to each other).

In other words, the contact member 30 may be injected between the entire height of the folding part 23 and ½ or more of the entire height of the folding part 23. At this time, ½ or more of the entire height is based on a portion of the case 21, to which the folding part 23 is connected.

When injecting and adhering the adhesive member 30 in a range of less than ½ of the entire height of the folding part 23, fluttering, bending, twisting, and the like may occur in the detached portion of the folding part 23

Therefore, when injecting the adhesive member 30 in a range between the entire height H of the folding part 23 and ½ or more of the entire height (½H) and adhering the folding part 23 to the case 21, a length of the folding part 23, which is not adhered, is decreased, such that fluttering, bending, twisting, and the like of the folding part 23 may not occur.

An angle between the folded folding part 23 and one surface of the case 21 may be 5 degrees or more and 25 degrees or less. In order for the adhesive member 30 to be injected between the folding part 23 and the case 21 and cured, the folding part 23 and the case 21 may be spaced apart from each other at an angle of 5 degrees or more. On the other hand, if the distance between the folding part 23 and the case 21 is too large, a large amount of the adhesive member 30 is needed. As a result, efficiency of adhesive property, and the like may be reduced. Therefore, the folding part and the case 21 may be formed so as to be spaced apart from each other at an angle of 25 degrees or less.

The adhesive member 30 is made of a polyurethane adhesive so that the adhesive member 30 may have a predetermined elastic force even after the adhesive member 30 is cured. Due to the adhesive member 30 that may have the elastic force even after curing, it is possible to reduce an impact applied thereto from an outside.

The thickness of the adhesive member 30 cured between the folded folding part 23 and the case 21 may be 0.5 mm or more and 2 mm or less. If the thickness of the adhesive member 30 cured between the folded folding part 23 and the case 21 is large exceeding the above range, the volume and/or thickness of the secondary battery module may be increased, and efficiency of the adhesive property may be reduced. Therefore, the adhesive member 30 cured between the folding part 23 and the case 21 may have a thickness of 0.5 mm or more and 2 mm or less.

The polyurethane adhesive is not sharp in terms of a shape after curing, and may have elasticity in a soft form. The polyurethane adhesive may be obtained by synthesizing polyol and a chain extender with a diisocyanate as well known in the art, and the chain extender used in the synthesis may be a diol or a diamine Physical properties of the adhesive may be variously controlled by adjusting types or molecular weights of the chain extender, diisocyanate and a polyol monomer. The polyurethane adhesive that can be used in the embodiment of the present invention may have a viscosity in a range of 10000 to 15000 cps when measuring by a Brookfield rotational viscometer at a temperature of 120° C. When adhering the folding part 23 by using the polyurethane adhesive having a viscosity within the above range, workability such as efficiency and result of operation are improved, and the shape of the adhesive (the adhesive member 30) may be maintained during curing the adhesive. If the viscosity of the adhesive is out of the above range (i.e., if it is less than or exceeding the above range), it is difficult to maintain the shape of the adhesive during curing the adhesive, and the workability is deteriorated, and thereby causing a problem in manufacturing the secondary battery 10. If necessary, the viscosity of the adhesive may be controlled by using a viscosity regulator. For example, when using a thixotropic agent etc., the viscosity of the adhesive may be increased, and when using a diluent or a dispersant, the viscosity of the adhesive may be reduced. The viscosity regulator may use a commonly known substance, and an amount of the viscosity regulator to be used is not particularly limited.

In addition, when curing for 2 hours or more, the polyurethane adhesive has a peel-off strength of 3 kgf/in measured by a T-peel test, and a static shear holding time of 250 hours or more measured by a static shear test at a temperature 85° C. and a humidity of at 85%. The adhesive member 30 made of a polyurethane adhesive having the above-described physical properties may maintain a predetermined elasticity, such that it is possible to reduce piercing the electrode assembly 11 or impact applied to the electrode assembly 11.

In addition, in order to maintain the performance of the secondary battery 10 and secure its stability, insulating properties between the inside and outside of the secondary battery 10 may be important. Therefore, the polyurethane adhesive as the adhesive member 30 used in the embodiment of the present invention may be required to have a dielectric breakdown voltage for ensuring insulating properties. Preferably, the dielectric breakdown voltage measured according to ASTM D149 of the polyurethane adhesive according to the present example may be 5 to 20 kV/mm More preferably, the dielectric breakdown voltage of the polyurethane adhesive according to the present example may be 8 to 15 kV/mm.

The dielectric breakdown voltage required in the polyurethane adhesive of the present example may be ensured by mixing an insulation material with the polyurethane resin. The insulation material used for this purpose may be, for example, ceramic particles such as alumina, SiC, and ZnO.

Further, since the polyurethane adhesive has a lower curing rate than that of an acrylic or epoxy resin, the adhesive member 30 may not be cured while the folding part 23 is brought into contact with the case 21 after injecting the adhesive member 30 into the folding part 23.

Figure 5A:
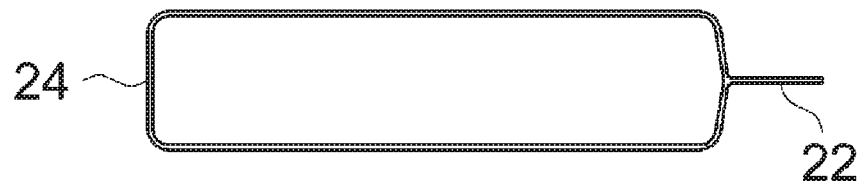
FIGS. 5A and 5B are cross-sectional views illustrating a sealing part and a bottom part of the secondary battery according to the embodiment of the present invention.
Figure 5B:
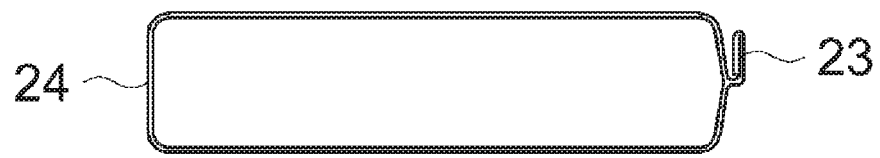

FIGS. 5A and 5B are cross-sectional views illustrating the sealing part and a bottom part of the secondary battery according to the embodiment of the present invention.

Referring to FIGS. 5A and 5B, the sealing parts 22 may be formed on three (3) sides of the electrode assembly 11 along the peripheries thereof. A bottom part 24 may be formed on one side in which the sealing part 22 is not formed. For example, the sealing parts 22 may be formed at a portion in which the electrode tab 12 is drawn out and a portion above the portion in which the electrode tab 12 is drawn out along the peripheries of the secondary battery 10. The bottom part 24 may be formed at a portion below the portion in which the electrode tab is drawn out without sealing. Since the sealing part 22 is not formed on the bottom part 24 side, the space occupied by the sealing part 22 may be reduced. Even if forming the folding part by folding the sealing part 22, the folding part also occupies a space. Therefore, such a member is not formed at all, thereby the space occupied by the secondary battery 10 may be dramatically reduced.

The bottom part 24 may be formed by a state in which one side of the electrode assembly 11 is in contact with the case 21 without being sealed. The bottom part 24 may be formed corresponding to an area and shape of the battery cell 11. In the secondary battery 10 having the bottom part 24 formed therein, a cooling plate (not shown) is disposed on the bottom part 24 side, such that the electrode assembly 11 may be cooled by the cooling plate. Since the bottom part 24 may directly contact with a cooling member such as the cooling plate without the folding part interposed therebetween, the cooling efficiency of the secondary battery 10 may be improved by forming the bottom part 24

Figure 6A:
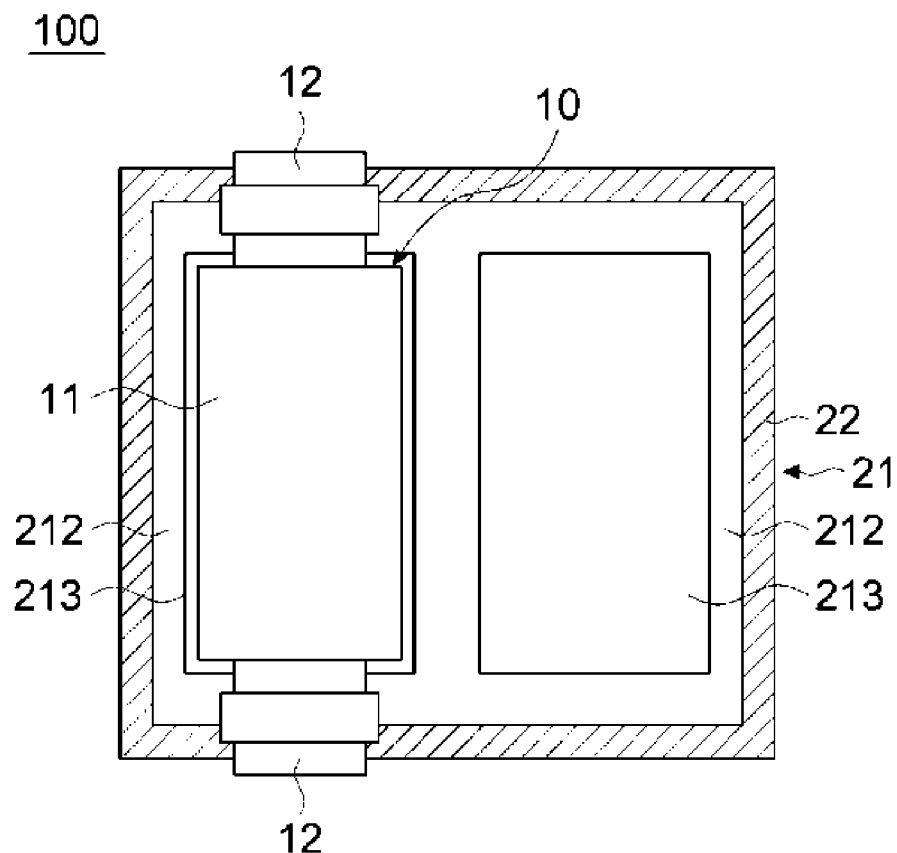
FIGS. 6A and 6B are cross-sectional views illustrating the pouch-type secondary battery according to the embodiment of the present invention.
Figure 6B:
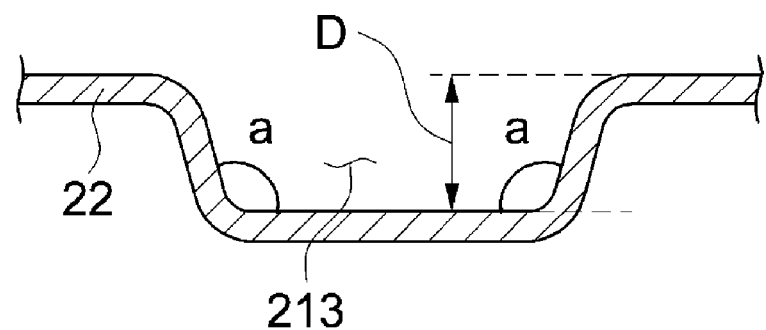

FIGS. 6A and 6B are cross-sectional views illustrating the pouch-type secondary battery according to the embodiment of the present invention.

Referring to FIGS. 6A and 6B, the pouch-type secondary battery 100 according to the embodiment of the present invention includes the electrode assembly 11 including a plurality of electrode bodies stacked with a separator interposed therebetween, and the electrode assembly 11 is packaged with the case 21. In order to package the electrode assembly 11, the case 21 including a pouch film 212 and the sealing parts 22 formed on the outer circumferences of the pouch film 212 may be used.

The electrode assembly 11 may be a jelly roll wound in an oval shape, or the like in a state in which the cathode electrode tab and the anode electrode tab are alternately overlapped with each other with a separator interposed therebetween. The electrode tabs 12 may be drawn out from both ends of the electrode assembly 11, and welding portions (not illustrated) may be formed between the electrode tabs 12 and the electrode assembly 11 to connect them with each other.

The pouch film 212 may include an aluminum thin film. The reason of using the aluminum thin film in the pouch film 212 is to resist severe thermal environments, mechanical impacts, or the like as well as to achieve miniaturization, weight reduction, and slimness.

The pouch film 212 may further include a polymer film such as a polyethylene terephthalate (PET) resin, polyethylene naphthalate (PEN), or nylon resin as an outer layer at the outside of the aluminum thin film in order to protect the secondary battery from the external environment.

The pouch film 212 is adhered to each other by thermal fusion bonding at the sealing part, and may further include an adhesive layer made of polyethylene (PE), polyolefin such as non-stretched polypropylene (casted polypropylene, cPP) or polypropylene (PP), or a copolymer thereof, as an inner layer for adhering each other.

A pair of forming parts 213 for housing the electrode assembly 11 may be formed in the pouch film 212. The forming part 213 may be formed by a method of pressing the pouch film 212 by a press in a recessed shape into the pouch film 212.

In accordance with the pouch-type secondary battery 100 according to the embodiment of the present invention, the volume and thickness of the pouch-type secondary battery 100 may be minimized by minimizing the range in which the sealing part 22 protrudes. The range in which the sealing part 22 protrudes may be determined by a forming angle a.

The forming part 213, in which the electrode assembly 11 is to be housed, may be formed in a tapered shape. At this time, the forming part 213 may have a predetermined forming angle a inside the electrode assembly 11 housed therein. The forming angle a may be formed on the side pressed into the pouch film 212. The forming part 213 may be tapered by the forming angle a.

The volume and thickness of the pouch-type secondary battery 100 in which the folding part 23 is attached to the case 21 of the electrode assembly 11 may be minimized as the forming angle a is close to a right angle. The reason is that the sealing part 22 forming the folding part 23 protrudes as the forming angle a has an angle not close to the right angle. As protrusion of the sealing part 22 is increased, an extra space inside the pouch-type secondary battery module is increased, and thereby increasing the volume and thickness of the pouch-type secondary battery module.

The forming angle a may be determined according to a depth D of the forming part. The depth D of the forming part may be 3.8 mm or more and 7 mm or less. At this time, an angle at which the folding part 23 is folded may be determined according to the depth D of the forming part 213. When the depth D of the forming part is 3.8 mm or more, the forming angle a may be 114 degrees, and when the depth D of the forming part is 7 mm or more, the forming angle a may be 96 degrees.

In other words, when a preferable depth D of the forming part for minimizing the volume and thickness of the pouch-type secondary battery 100 is 3.8 mm or more and 7 mm or less, the forming angle a may be included in a range of 96 degrees or more and 114 degrees or less.

Further, a coating thickness of the adhesive member 30 may be determined according to the depth D of the forming part. The forming angle a is determined according to the depth D of the forming part, and an angle between the case 21 and the folding part 23 may be determined according to the forming angle a. Further, the coating thickness of the adhesive member 30 may be determined according to the angle between the case 21 and the folding part 23.

When the depth D of the forming part is 3.8 mm or more and 7.0 mm or less, the coating thickness of the adhesive member 30 may be included in a range of 0.36 or more and 2.12 mm or less.

Hereinafter, preferred examples of a polyurethane adhesive used in the adhesive member 30 are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example and Comparative Examples

Polyurethane adhesives as described in Table 1 below were prepared, and a T-peel test, viscosity index, and shear adhesion of each polyurethane adhesive were measured on a pouch film having a PET protective film layer formed on an aluminum thin film.

i) T-Peel Test

A T-peel test was performed according to the standard test specification ASTM D1876-01, which is a "test method for determining peel resistance of an adhesive," in order to confirm the peel resistance in physical properties between the polyurethane adhesives described in Table 1 below.

ii) Viscosity Index

In order to confirm viscosities of the polyurethane adhesives described in Table 1 below, viscosity indexes of the polyurethane adhesives of the example and comparative examples were measured using a Brookfield rotational viscometer at a measurement temperature of 120° C.

iii) Shear Adhesion

A shear adhesion test was performed according to the standard test specification ASTM D3654, which is a "test method for determining shear adhesion," in order to confirm static shear holding forces among the physical properties between the polyurethane adhesives described in Table 1 below. Table 1 below shows holding times (hour) of the respective polyurethane adhesives, which were measured in the test performed according to the ASTM D3654 test method at a measurement temperature of 85° C. and a measurement humidity of 85%.

TABLE 1

| Section | T-peel test (cured for 2 hours, kgf/in) | Viscosity index (cps, at a temperature of 120° C.) | Shear adhesion (hr) | Remark |
| --- | --- | --- | --- | --- |
| Example | 3.02 | 14000 | >250 | Polyurethane adhesive |
| 3M Co., 1090B (Comparative Example 1) | 2.04 | 17000 | 44.5 | Polyurethane adhesive |
| 3M Co., TE100 (Comparative Example 2) | — | 7000 | 76.7 | Polyurethane adhesive |

TABLE 1-continued

| Section | T-peel test (cured for 2 hours, kgf/in) | Viscosity index (cps, at a temperature of 120° C.) | Shear adhesion (hr) | Remark |
|---|---|---|---|---|
| 3M Co., TS230 (Comparative Example 3) | 0.33 | 9000 | >250 | Polyurethane adhesive |

The polyurethane adhesives of the example and comparative examples were applied to a folding part of a pouch-type secondary battery, respectively, then physical properties were evaluated. Results thereof are described in Table 2 below.

The respective adhesives were applied and attached between a folding part and a side face of a secondary battery as illustrated in FIG. 4 so as to have a thickness of 0.5 to 1 mm, then cured for 2 hours at room temperature, followed by visually observing to confirm adhesive properties and the application properties, and results thereof are described in Table 2 below. For a high temperature and high humidity test, the secondary battery having the folding part attached thereto by the respective adhesives was exposed to an environment at a temperature of 85° C. and a relative humidity of 85% for 7 days, then left for 2 hours at room temperature, followed by visually observing to confirm appearance thereof.

TABLE 2

| Section | Adhesive property | Application property | High temperature and high humidity test |
|---|---|---|---|
| Example | ○ | ○ | ○ |
| Comparative Example 1 | Δ | ○ | X |
| Comparative Example 2 | X | X | X |
| Comparative Example 3 | Δ | | ○ |

In the above Table 2, the adhesive property was determined by conforming whether there is a portion in which the folding part was detached from the adhesive. Results thereof are indicated according to the following standards, wherein 'O' denotes that there is no detachment, 'Δ' denotes that there are some detached portions, and 'X' denotes that there is no attachment.

The application property was determined by conforming whether the adhesive flows out of an adhesive region after the application of the adhesive and whether the adhesive flows out to an outside after adhering the folding part. Results thereof are indicated according to the following standards, wherein 'O' (good) denotes that both properties are satisfied, 'Δ' (normal) denotes that one of both properties is satisfied, and 'X' (poor) denotes that both properties are not satisfied.

The high temperature and high humidity evaluation were also performed by using the same standards as the evaluation of adhesive property.

As shown in the above Table 2, it can be seen that the polyurethane adhesive (example) according to the embodiment of the present invention is highly evaluated in adhesive property, application property, and high temperature and humidity evaluation (shear adhesion evaluation).

That is, the polyurethane adhesive according to the present example had a peel-off strength of 3 kgf/in or more after curing for 2 hours in the T-peel test, such there was no detachment occurred in a case of attaching the folding part 23 over time. On the other hand, the polyurethane adhesives of Comparative Examples 1 to 3 had significant lower peel-off strengths than the present example after curing for 2 hours in the T-peel test, such that the folding part 23 and the case 21 would be spaced apart or detached from each other after attaching the folding part 23 over time.

Further, since the polyurethane adhesive according to the present example had a sufficient high viscosity, the adhesive would be applied and the shape thereof would be maintained. On the other hand, since the polyurethane adhesives of Comparative Examples 2 and 3 except for Comparative Example 1 had significantly lower viscosities than that of the present example, the shape thereof would not be maintained after applying the adhesive to flow down, and thereby hindering the attaching operation. The polyurethane adhesive of Comparative Example 1 had a higher viscosity than that of the present example. However, when the viscosity is too high, workability such as operation efficiency may be adversely affected.

Further, the polyurethane adhesive according to the present example may maintain the adhesive force for a long period time in a shear adhesion evaluation performed at high temperature and high humidity. In this regard, the polyurethane adhesives of Comparative Example 3 shows the similar result to that of the present example. However, the polyurethane adhesives of Comparative Examples 1 and 2 show a significant short time for maintaining the adhesion at high temperature and high humidity, therefore it can be seen that these adhesives are not suitable for use in an environment in which the secondary battery 10 is placed.

In summary the above results, it can be seen that the polyurethane adhesive according to the present example was superior in terms of adhesive properties, application properties and high temperature and high humidity evaluation to the adhesives of the comparative examples, and thereby, the polyurethane adhesive according to the present example is more suitable to attach the folding part 23 of the secondary battery 10 than the adhesives of the comparative examples.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the embodiments, but be defined by the appended claims as well as equivalents thereof.

DESCRIPTION OF REFERENCE NUMERALS

10: Secondary battery
11: Electrode assembly
12: Electrode tab
21: Case
212: Pouch film
213: Forming part
22: Sealing part
23: Folding part
24: Bottom part
30: Adhesive member
S1: First folding state
S2: Second folding state
100: Ppouch-type secondary battery

The invention claimed is:

1. A pouch-type secondary battery comprising:
a case configured to house an electrode assembly from which electrode tabs are drawn out;
sealing parts formed by adhering the case along outer peripheries of the electrode assembly; and
folding parts formed entirely by folding the sealing parts of surfaces on which the electrode tab drawn to an outside of the case is not formed, the folding parts being configured not to protrude from the case in the thickness direction of the electrode assembly,
wherein a height of the folded folding part has a relationship with a thickness of the electrode assembly as the following equation:

$$H \leq T/2$$

wherein, H is the height of the folded folding part, T is the thickness of the electrode assembly, based on a cross-section perpendicular to a direction in which the electrode tabs of the electrode assembly are drawn out,
wherein the folded folding part is attached to one surface of the case by an adhesive member,
wherein a distance W in which the case of surface on which the electrode tab is not formed and the folding part are adhered to each other via the adhesive member is less than the height H of the folded folding part and greater than or equal to ½ of the height H of the folded folding part,
wherein the folding part comprises a first folding state in which the folding part is folded 180 degrees by a half (½) or less of an entire length thereof, and a second folding state in which the folding part is folded so as to completely come into contact with the case of the electrode assembly from the first folding state;
wherein the case has a pair of forming parts formed therein including a space for housing the electrode assembly;
wherein the forming parts have a depth in which the electrode assembly is housed of 3.8 mm or more and 7 mm or less and an angle of 96 degrees or more and 114 degrees or less;
wherein an angle between the folded folding part and one surface of the case is within a range of 5 degrees or more and 25 degrees or less,
wherein the adhesive member is polyurethanehas having a peel-off strength of 3 kgf/in or more measured by a T-peel test when curing for 2 hours, and
wherein a thickness of the adhesive member applied between the folding part and the case is determined according to the depth of the forming part, and is 0.36 mm or more and 2.12 mm or less.

2. The pouch-type secondary battery according to claim 1, wherein a thickness of the adhesive member cured between the folded folding part and the case is 0.5 mm or more and 2 mm or less.

3. The pouch-type secondary battery according to claim 1, wherein a position of the adhesive member located at the folding part has a relationship with the height of the folded folding part located at the folding part as the following equation:

$$\tfrac{2}{3}H \leq W < H.$$

4. The pouch-type secondary battery according to claim 1, wherein the polyurethane adhesive has a static shear holding time of 250 hours or more at a temperature 85° C. and a humidity of 85%.

5. The pouch-type secondary battery according to claim 1, wherein the polyurethane adhesive has a viscosity of 10000 to 15000 cps at a temperature of 120° C.

6. The pouch-type secondary battery according to claim 1, wherein the adhesive member is made of a polyurethane adhesive having a dielectric breakdown voltage of 5 to 20 kV/mm.

7. The pouch-type secondary battery according to claim 1, wherein the sealing parts are formed on four (4) sides along the peripheries of the electrode assembly.

8. The pouch-type secondary battery according to claim 1, wherein the sealing parts are formed on three (3) sides along the peripheries of the electrode assembly.

9. The pouch-type secondary battery according to claim 8, wherein a bottom part is formed on one side in which the sealing part is not formed.

10. A pouch-type secondary battery comprising:
a case including a pair of forming parts including a space for housing an electrode assembly;
a sealing part formed by adhering the case along an outer periphery of the electrode assembly; and
a folding part formed entirely by folding the sealing part of a case surface on which an electrode tab drawn out of the case is not formed,
wherein a height H of the folding part and a thickness T of the electrode assembly follow the following equation:

$$H \leq T/2,$$

wherein the folding part is folded twice and is attached to the case surface with an adhesive member,
wherein a distance W in which the case surface and the folding part are adhered to each other is less than the height H of the folding part and greater than or equal to ½ of the height H of the folding part,
wherein the folding part does not protrude from the case in the thickness direction of the electrode assembly,
wherein the forming parts have a depth of 3.8 mm or more and 7 mm or less and an angle of 96 degrees or more and 114 degrees or less;
wherein an angle between the folding part and the case surface is within a range of 5 degrees or more and 25 degrees or less, and
wherein the adhesive member is polyurethane having a peel-off strength of 3 kgf/in or more measured by a T-peel test when curing for 2 hours and is formed in a coating thickness of 0.3 mm or more and 2.12 mm or less.

* * * * *